United States Patent [19]

Arita et al.

[11] 4,104,041

[45] Aug. 1, 1978

[54] APPARATUS AND METHOD FOR TREATING WASTE GAS FROM UREA PRILLING TOWER

[75] Inventors: Hidemasa Arita, Hunabashi; Hitoshi Tomiyama, Tokyo; Shigeyasu Mori, Tama, all of Japan

[73] Assignee: Chiyoda Chemical Engineering & Construction Co., Ltd., Japan

[21] Appl. No.: 748,541

[22] Filed: Dec. 8, 1976

[51] Int. Cl.² .............................................. B01D 47/00
[52] U.S. Cl. ........................................ 55/90; 55/233; 55/240; 55/259; 261/100; 261/116
[58] Field of Search ...................... 55/84, 85, 89–92, 55/93–95, 233, 240, 241, 242, 259; 261/113, 116, 100, 105

[56] References Cited

U.S. PATENT DOCUMENTS

| | | | |
|---|---|---|---|
| 1,810,410 | 6/1931 | Alldredge | 261/113 |
| 3,064,408 | 11/1962 | Erga et al. | 55/90 |
| 3,713,277 | 1/1973 | Sackett, Sr. | 261/116 |
| 3,941,572 | 3/1976 | Uchiyama et al. | 55/84 |

FOREIGN PATENT DOCUMENTS

9,443   1971   Japan ............................................. 55/90

*Primary Examiner*—Bernard Nozick
*Attorney, Agent, or Firm*—Armstrong, Nikaido, Marmelstein & Kubovcik

[57] ABSTRACT

This invention relates to a process for treating the waste gas discharged from a urea prilling tower and an apparatus therefor. More particularly, this invention relates to a process for treating the waste gas discharged from a urea prilling tower and an apparatus therefor, characterized by that a continuous liquid or water film flow (hereinafter called merely a liquid film) of a scrubbing solution and/or an absorption liquid (hereinafter called merely a scrubbing solution) is formed so as to traverse across the whole passage of the waste gas within the scrubbing tower, and when the waste gas passes through such a liquid film the fumy minute particles (hereinafter called fumes) of urea, about 1 micron in size, which are contained in said waste gas, are removed by contacting with the scrubbing solution.

10 Claims, 10 Drawing Figures

APPARATUS AND METHOD FOR TREATING WASTE GAS FROM UREA PRILLING TOWER

BACKGROUND OF THE INVENTION

In the manufacture of urea fertilizer, from the top of the urea prilling tower of spray type or jet type is discharged an enormous quantity of air used for cooling of sprayed or jetted urea, as waste gas. The waste gas contains about 0.1 g/N m$^3$(waste gas) of fumes and about 200 ppm of NH$_3$ gas and is at a temperature of 70° C or thereabout.

Such dust content and toxic gas content are lower than the legal regulation limits, and also even when such a dust or a gas is dispersed in the atmosphere, they may not be considered as harmful because they are soluble in water. Further, the dust content as low as 0.1 g/N m$^3$ is comparable to that obtained in the case where the highgrade treatment for dust removal is carried out by means of a dust collector such as an electrostatic precipitator, so that it can be hardly seen as smoke by the naked eye. But as in the case of the waste gas discharged from a urea prilling tower the dust is in the form of fumes whose particulate surface area is extremely large, the light seen through is scattered, and moreover, because of its quantity discharged being as extremely large as several hundred thousands N m$^3$/hr, when the waste gas is watched, a large number of fumes overlap each other causing the light to be scattered, whereby the fumes look like purply white or black smoke by the naked eye. Further, because of its temperature being as low as about 70° C, the waste gas readily attains the atmospheric temperature after having been discharged, and thus the waste gas is characterized by that it can hardly diffuse, trailing over without disappearing for a long period of time after having been discharged.

For the above described reasons, in order to avoid the ill feeling of the inhabitants in the vicinity of the manufacturing factory of urea fertilizer it was necessary to remove the fumes in the waste gas to the extent that no fumes could be perceptible to the naked eye.

As a result of an experiment which was carried out by installing an experimental apparatus on the top of a urea prilling tower for dust collection it was found that in order to make the fumes in the waste gas indiscernible to the naked eye, the dust content should be reduced at least to less than 0.02 g/N m$^3$, requiring more than 80% of efficiency in the dust collection.

Heretofore, in order to achieve the dust removal to such an extent by the use of a dust collector, use was made of a filtration dust collector such as a bag filter, but such a filter is undesirable in view of the fact that the pressure loss is so large that an enormous filtration area is required for a huge quantity of waste gas as much as several hundred thousands N m$^3$/hr to be treated, and there are various problems such as concerning the automatic regulation for the variation in the filtration resistance due to the pore clogging, the exchange of the filter cloth, etc. On the other hand, an electrostatic precipitator, which can perform the dust collection by the action of static electricity, is advantageous in that the pressure loss is small as well as the electric power consumption is small, but it is disadvantageous in that such precipitator requires a large volume and a large weight and also its cost is high, and so on. All these dry dust collectors are not only heavy in the weight but also high in the cost, so that none of them can satisfy the conditions that a huge quantity of waste gas containing fumes in a very low concentration (ca. 0.1 g/N m$^3$) is treated in more than 80% of efficiency of dust collection by means of a dust collector, whose volume and weight of equipment are small and cost is low and moreover, which is capable of stable operation at low operation cost. Furthermore, they are disadvantageous in that some ammonia gas cannot be removed, and so on.

To remove at the same time a minute quantity of fumes and some quantity of ammonia gas contained in a huge quantity of waste gas there is also a method of dust collection by scrubbing (wet dust collection). This method of wet dust collection is far much more advantageous than the above described dry dust collection because the operation is not only very simple, lacking movable portions, but also very easy in cleaning, inspection, and repair, and the waste solution after scrubbing can also be circulated for reuse in such a way that if these water-soluble fumes and gas enter into solution and attain a certain concentration it is returned to the urea manufacturing plant without the necessity of disposing of the waste solution.

As the scrubbing dust collector which can remove fumes in a high efficiency there are known, heretofore, a venturi scrubber, a low pressure multistage venturi scrubber, a jet scrubber, etc., but those which can remove fumes in a high efficiency had usually any one of the deficiencies that the pressure loss is large, the liquid to gas ratio is large, or a high pressure pump is required for spraying the scrubbing solution.

SUMMARY OF THE INVENTION

The waste gas from a urea prilling tower is at first wetted by the perforated tray, and then brought in contact with the scrubbing solutions on the lower mesh tray and the upper mesh tray, where the fumes in said waste gas are removed, and further, the mist, which is the liquid entrainment with said waste gas when it passes through the upper mesh tray, is recovered by the demister.

The scrubbing solution is sprayed onto the underside of the upper mesh tray from the nozzles of the spraying device located between the upper mesh tray and the lower mesh tray co-currently with the gaseous flow so as to form a continuous liquid film flow on said upper mesh tray, and then the scrubbing solution is further allowed to flow down through said lower mesh tray to the perforated tray so as to form a liquid film flow on each of these trays.

DETAILED DESCRIPTION OF THE INVENTION

The waste gas scrubber of this invention was devised based on the result of the experiment which was carried out in a pilot experimental apparatus, 1 m$^2$ in crosssection as shown in FIGS. 1 thru 4, for the purpose of removing a minute quantity of fumes in discharged waste gas by a wet process, and it is characterized by that even on an enlarged scale its performance is as excellent as that shown in the experiment.

A process wherein a liquid film is utilized to remove the dust contained in a gas by allowing said liquid film to absorb the dust is disclosed in Japanese Patent Application No. 9521/1967 (Japanese Patent Publication No. 9443/1971), but as in this process it is contemplated to form only a liquid film that flows down in an inclined direction, such is not an ideal liquid film aimed at in this invention.

The first of the characteristic features of this invention resides in that the scrubbing solution is brought in complete contact with the waste gas by making the upper mesh tray satisfy the two conditions (1) when the liquid film is formed on the upper mesh tray having less than 2 mm opening the scrubbing solution is first sprayed into the upstream of the gaseous flow passing through the screen which means upper mesh tray, so that it can be supplied co-currently with said gaseous flow, and (2) the distance between the upper mesh tray and the spray nozzles is taken to be twice the reach of the splashes from the spraying, and further the spray nozzles are provided in such a number and arrangement that the whole surface of the upper mesh tray can be sufficiently covered by the splashes: The second of the characteristic features resides in that the dust removal efficiency of the liquid film formed on the above described upper mesh tray is improved in such a way that after the waste gas has been wetted and uniformly distributed by the perforated tray continuously, it is further wetted and uniformly distributed, by the liquid film formed on the lower mesh tray before it is treated with the upper mesh tray and the third resides in that the dust removal efficiency is further improved by providing the demister which can recover the liquid entrainment accompanying the gas passing through the upper mesh tray.

By embodying the above described three characteristic features at the same time, thus the highly efficient dust removal has become possible even by a very simple apparatus without the necessity of the multistage tray as disclosed in Japanese Patent Application No. 9521/1967.

In order to make this invention more understandable how the present inventors were led to this invention by repeating trial and error will be explained in due order.

(1) The apparatus of this application, which utilized the basic principle that a liquid film is formed on a screen having less than 2 mm openings as disclosed in the above described Japanese Patent Application No. 9521/1967 (Japanese Patent Publication No. 9443/1971), performs both the capture of fumes and the absorption of the gas at the same time while passing the waste gas through said screen, but when the liquid film is formed it is of primary importance that the supply of the scrubbing solution is carried out by spraying said solution into the upstream of the gaseous flow passing through the mesh tray, said spraying being controlled so as to form liquid droplets of 300 μ or less in size in order that the liquid drops can reach the mesh tray, being carried by the gaseous flow.

Figure 1:
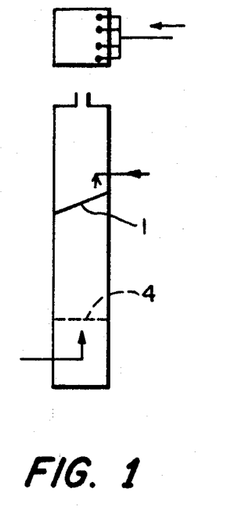
FIGS. 1, 2, 3, and 4 are diagrams showing the relative positions of mesh tray and spray in the scrubber until reaching this invention.

In the experiment, in which the supply of the scrubbing solution was carried out by spraying large liquid drops on the mesh tray from the downstream side of the gaseous flow as shown in FIG. 1 so that the scrubbing solution flows down the inclined screen 1 to form a liquid film, the wetting occurred only on the upper surface of the mesh tray but not on the lower surface, that is, on the upstream side of the gaseous flow, therefore, the dust removal efficiency obtained was only about 20%. From the above result it was found that in mere passage of the gaseous flow through the liquid film the greater part of fumes cannot be captured by the liquid film, freely passing through it as such.

Figure 2:
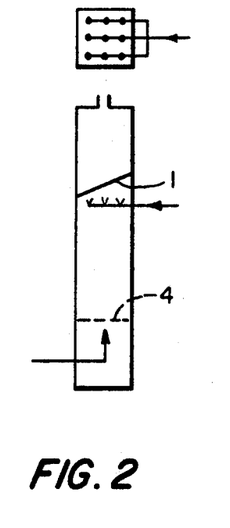

(2) Next, when the scrubbing solution is supplied to the mesh tray by spraying it from the upstream side of the gaseous flow as shown in FIG. 2, if channelling occurs in the gaseous flow, the liquid film is formed either partially or unevenly in the thickness, but as the presence of a liquid film in the passage of the gaseous flow through the mesh tray causes a pressure drop between the upstream and the downstream of the gaseous flow the gaseous flow tends to pass through the portion in which the liquid film is absent or thin. Since the gaseous flow contains liquid drops (containing fumes also at the same time), when it passes through the portion of the screen in which the liquid film is absent or thin, it supplies many liquid drops thereto and as a result a liquid film of even thickness is always formed on the screen. Nevertheless, according to the result of the experiment carried out using one sheet of mesh tray as shown in FIG. 2, the dust removal efficiency obtained was yet only about 50%.

Figure 3:
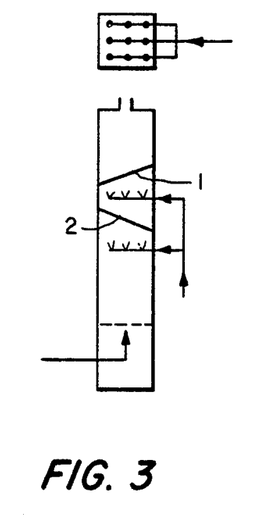

(3) In the experiment in which using two sheets of mesh trays in two stages as shown in FIG. 3 the scrubbing solution was supplied by spraying it from the upstream side of the gaseous flow at the respective mesh trays, the dust removal efficiency was about 50 – 60% almost without varying even if the quantity of the liquid fed was increased or decreased.

Figure 4:
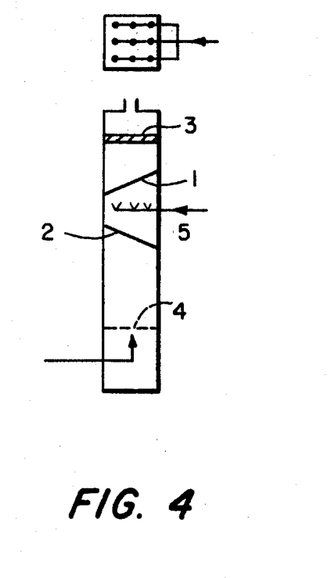

(4) As shown in FIG. 4 the scrubber was provided with a demister 3 near its gas exit so as to capture the splashes of the scrubbing solution, and further, in order to reduce the supply rate of the scrubbing solution the scrubbing solution was supplied by spraying it into the upstream of the gaseous flow seen from the upper mesh tray, that is, in between upper mesh tray 1 and lower mesh tray 2 so that the scrubbing solution which has flowed down upper mesh tray 1 can further flow down onto lower mesh tray 2. As a result the dust removal efficiency became more than 80%.

(5) The velocity of the gaseous flow employed in this experiment was in the range of 1 thru 3 m/sec, but it was found that the larger the velocity the better the dust removal efficiency. This is probably because when the gaseous flow passes through a liquid film, small vortexes are formed and capture the fumes which are floundering in the gaseous flow. However, when the velocity is too fast, the gas passing through the liquid film is accompanied by many splashes, which happen to pass through the demister, so that the dust removal efficiency decreases to 70 – 80%.

The above described result indicates that in the method as shown in FIG. 4 the best efficiency of the dust removal is obtained in the vicinity of 2.5 m/sec of gas velocity. In FIG. 4 it is considered that as the dust-containing gas is sufficiently wetted with mesh tray 2 the fumes are agglutinated in a more or less degree, (as described in the experimental report regarding aerosol minute particles), and thus when the wetted fumes pass through mesh tray 1 they readily adhere to the completely wetted mesh tray as well as the liquid film. In such a case minute splashes of the scrubbing solution are generated, but it is presumed that they are captured by the last demister. Although it was already described that the liquid film is evenly formed on mesh tray 1, in mesh tray 2 also the liquid film can always be evenly formed on its whole surface. This is because the scrubbing solution flowed down from mesh tray 1 flows over mesh tray 2, but as the dust-containing gas always flows through mesh tray 2, even if the liquid film is partially formed, the pressure loss in the liquid film portion is large and the force tending to lift the liquid film acts, so that though the thick portion of the liquid film is lifted up owing to the large pressure loss, the scrubbing solution flowed down flows into the portion forming no liquid film and the liquid film is formed on the whole surface. The function of this experimental apparatus which always tends to form a liquid film of even thickness on mesh trays 1 and 2 is characteristic in that even when the mesh trays have a large area in a large-sized apparatus the liquid film can be formed on their whole surfaces as well.

The essential points of this invention are indeed the ways and means for how to form the ideal liquid film. In almost all the conventional scrubbers of liquid film type, the liquid film is formed by allowing the scrubbing solution to flow down along the surface of metallic screens, etc., on which the liquid film is to be formed, from a "trough", a "weir", or a pipe header (square — or round — shaped) which is attached to one marginal portion of said metallic screen, etc. In such a method for supplying scrubbing solution the liquid quantity required for forming the liquid film which is free from channelling or interruption of the flow over the whole surface of metallic screen, etc. must inevitably be larger than that required in this invention, which utilizes the gaseous flow. This is because it is almost impossible to fabricate or mount flatwise the whole surface of metallic screen, etc. along which the liquid film flows down, in such a way that it has neither distortion, ruggedness, nor inclination other than that in the downflow direction of the liquid film. In an extreme case it will also happen that the liquid film is not formed at all in some portion. Therefore, in order to form at least a liquid film spreading over the whole surface of the metallic screen it is necessary to increase the liquid quantity until the distortion, ruggedness, and inclination toward unwanted directions of the surface of the metallic screen become no longer significant. This implies further that a large-sized apparatus cannot be fabricated with ease, because the larger the size of the apparatus the larger become also the distortion and other defects.

In contrast with this, in the process of this invention, the misty scrubbing solution is supplied uniformly and continuously over the whole surface of the mesh tray co-currently with the gaseous flow uniformly distributed, so that all the equipment which supplies the scrubbing solution by flowing down from one marginal portion of metallic screen, etc., such as the above described trough, weir, or pipe header, is not provided, and is also of no use.

As to the upper mesh tray a satisfactory result can be obtained even in one stage, but a better efficiency can also be obtained in two or more stages. Since the gas passing through the liquid film on the upper mesh tray is accompanied by the splashes of the scrubbing solution, when another sheet of mesh tray is disposed above the said upper mesh tray, spaced about 100 mm therefrom, to operate in two stages, the splashes passing through the first stage mesh tray can form again a liquid film on the second stage mesh tray even without providing any particular spraying mechanism for the second stage mesh tray, and thus contact is achieved in the second stage also. However, it should be noted that the above described method is limited to two stages, and even when the mesh trays are provided in three or more stages, the liquid films formed on the mesh trays in the third and the following stages are all too unstable to give a completely continuous liquid film and to add to the effect. In the case where the allowable discharge amount of dust is limited so stringent that even by the above described constitution of the apparatus the allowable discharge amount cannot be satisfied, it is better to install 2 sets of the apparatus in series, in which one set means an apparatus comprising a spraying device and two mesh trays.

In this invention the distance between the upper mesh tray and the spray nozzles and the number of the nozzles are the requirements of critical importance. That is to say, since the scrubbing solution is supplied to the mesh tray accompanying the gaseous flow, this renders it possible to obtain a very thin liquid film which is stable against the gaseous flow and free from the occurrence of its breakage or interruption on the mesh tray, whereas if the distance between the mesh tray and the spray nozzles is not sufficiently large, the spray strikes directly the liquid film causing it to break. Therefore, it is necessary that this distance is taken to be larger than at least about twice the reach of the splashes which is due to spraying alone without the aid of the gaseous flow.

Also, in order to be able to form a continuous as well as uniform liquid film on the mesh tray, the splashes from the spray nozzles must be evenly supplied to the whole surface of the mesh tray, therefore, the number and the arrangement of the spray nozzles are limited.

The inclination of the mesh tray varies depending on the filament thickness, the number of openings, the manner of weaving, etc., but according to the present inventer's experiment it is preferably 10° or thereabout as the angle making with the plane perpendicular to the direction of the gaseous flow. In the usual scrubber use is made of the mesh tray having only one slope, but for a scrubber having a larger diameter the mesh tray may have both sloping sides, forming a ridge-roof.

Now, with reference to the accompanying drawing this invention will be explained more fully below.

Figure 5:
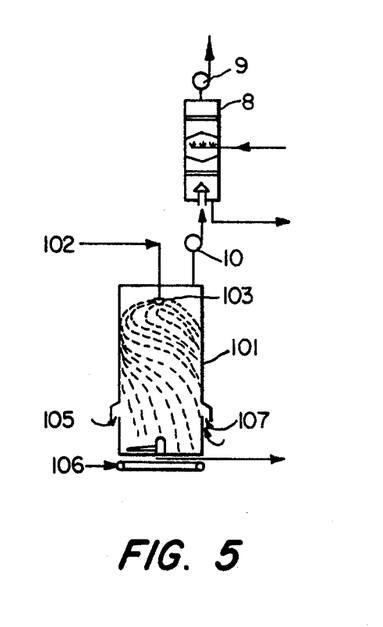
FIG. 5 is a diagram showing the relationship between a urea prilling tower and a scrubber, FIG. 6 indicates a cross-sectional view of a scrubber in detail.

FIG. 5 indicates a systematic diagram illustrating the relationship between the already installed urea prilling tower and the scrubber, 101 being the urea prilling tower. While the urea solution 102 which is jetted from prilling bucket 103 in the center of the top of the urea prilling tower is falling down through the tower, it is brought in direct contact with the atmospheric air induced by the induced draft fan 10 provided on the top of the tower and granulated, and the granules thus produced stay at the bottom of the tower. 105 is a scraper, and 106 is a belt conveyor for the transportation of the product. The air induced from air intake port 107 in the lower part of the prilling tower is led to scrubber 8 of this invention through the induced draft fan 10 as the waste gas from the prilling tower. The waste gas led to scrubber 8 is further induced by suction blower 9 provided on the top of the scrubber, and after having been scrubbed in the scrubber, is discharged into the atmosphere.

In addition, although in FIG. 5 (the same applies to FIG. 6 also), only one series comprising induced draft fan 10 and suction blower 9 and scrubber 8 is diagramatically shown, it should be understood that in actual practice there are installed four series, though the scrubbing liquid system installed is only one series.

Figure 6:
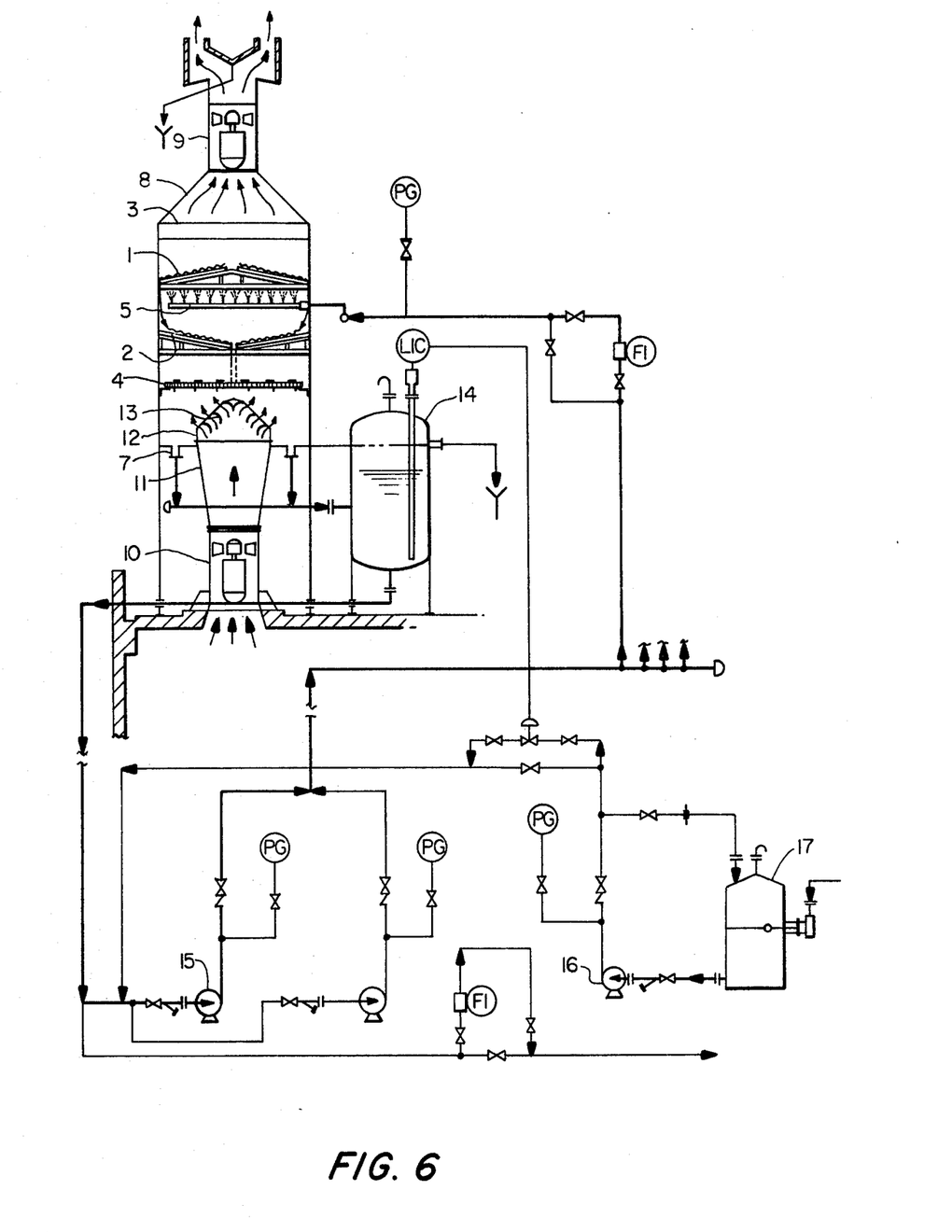

FIG. 6 indicates the scrubbing solution system in the scrubbing apparatus of this invention and the dust collecting mechanism by scrubbing in the scrubber of this invention.

At first the scrubbing solution system will be referred to.

As the scrubbing solution use is made of a 20 thru 40% by weight aqueous solution of urea. The scrubber 8 is provided with scrubbing solution tank 14 and scrubbing solution circulating pump 15 as attachments. The scrubbing solution is sprayed from spray nozzles 6 through spray manifold 5 provided in the scrubber by means of circulating pump 15, and after having scrubbed the waste gas from the prilling tower it performs scrubbing by circulating from the scrubbing solution exit port 7 at the bottom of the scrubber through scrubbing solution tank 14 to the intake port 15 of circulating pump. The collected urea dust dissolves in the scrubbing solution to raise the urea concentration therein. Thus, by the blowdown of the circulating scrubbing solution in an amount matching the collected urea dust and at the same time supplying fresh water from the outside of the system the urea concentration of the circulating scrubbing solution can be maintained constant during the operation. The scrubbing solution withdrawn is sent to the urea manufacturing system, where the urea dissolved in said scrubbing solution is recovered.

The urea concentration of the scrubbing solution in operation is 20 thru 40% by weight, which corresponds to the concentration such as having almost no effect on the solubility of urea or the dust collection efficiency of scrubbing. To make up the blowdown of the scrubbing solution for the regulation of urea concentration and the evaporation of the scrubbing solution into the waste gas, fresh water stored in make up water tank 17 is supplied to the circulating system by means of make up water pump 16. The make up water is supplied so as to maintain a constant liquid level in the scrubbing solution tank 14 by means of liquid level regulator LIC provided within said scrubbing solution tank 14. The material balance per $10^5 N$ $m^3/Hr$ of waste gas in the summer period in the scrubbing apparatus of this invention is as follows.

| Quantity of make-up water | 852 l/Hr |
| --- | --- |
| Quantity of scrubbing solution circulated | 24.2 $m^3$/Hr |
| Blowdown rate | 64 l/hr |
| Quantity of prilling tower effluent | $10^5$ N $m^3$/Hr |
| Urea content of prilling tower effluent | 0.15 g/N $m^3$ |
| Temperature of scrubber effluent | 48° C D. B. (32° C W. B.) |
| Urea content of scrubber effluent | 0.02 g/N $m^3$ |
| Temperature of scrubber effluent | 35° C |
| Urea content of circulating solution | 20 wt % |
| Urea recovering rate from blowdown solution | 13 kg/Hr |

As obvious from the above described data the quantity of the make up water per 1 N $m^3$ of waste gas is 8.52 cc (3.5% of the quantity of the circulating scrubbing solution).

Next, explanation will be given to the structure of the scrubber and the dust collecting mechanism that are the very core of this invention.

The scrubber is a vertical box tower which takes in the gas being treated from its bottom by means of induced draft fan 10 on the top of the prilling tower already installed and discharges said gas from the top, and it comprises a dust collecting mechanism by scrubbing in its middle portion.

The scrubbing solution, which was sprayed upwardly in parallel with the gaseous flow from spray nozzles 6 disposed throughout the whole horizontal crosssection of the tower of scrubber 8 by spray manifold 5, rises to upper mesh tray 1 together with the gaseous flow while scrubbing the gas. As shown in FIG. 6 upper mesh tray 1 is mounted with a slight gradient from the middle of the scrubber downwardly toward the tower shell. The misty scrubbing solution reached upper mesh tray 1 forms a liquid film on the mesh tray by its own surface tension with the meshes as nuclei as if it were caught by the mesh tray, and the liquid film thus formed flows down along the slope of the mesh tray. That is to say, the scrubbing solution sprayed from spray nozzles 6 forms a continuously flowing liquid film on upper mesh tray 1. The liquid film formed on upper mesh tray 1 descends along the shell wall of the scrubber down to lower mesh tray 2, and forms again a liquid film on lower mesh tray 2 in the same way as on upper mesh tray 1. Lower mesh tray 2 is mounted with a slight gradient from the tower shell downwardly toward the middle of the tower on the contrary to upper mesh tray 1, so that the liquid film on lower mesh tray flows down from the middle of the tower onto perforated tray 4. The scrubbing solution which flowed down onto perforated tray 4 is then scattered on the whole surface of perforated tray 4 by virtue of the gaseous flow blowing up from under and further flows down through each small hole of said perforated tray 4 onto the bottom of the scrubber, where it is discharged into scrubbing solution tank 14 through scrubbing solution exit port 7. On the other hand, the waste gas from the said prilling tower is sent by means of induced draft fan to the scrubber through gas inlet louver 12, which is made up of a plurality of guide vanes 13 of sufficiently large dimensions so that the scrubbing solution may not flow into the prilling tower even when both induced draft fan 10 and suction blower 9 are stopped.

Figure 7:
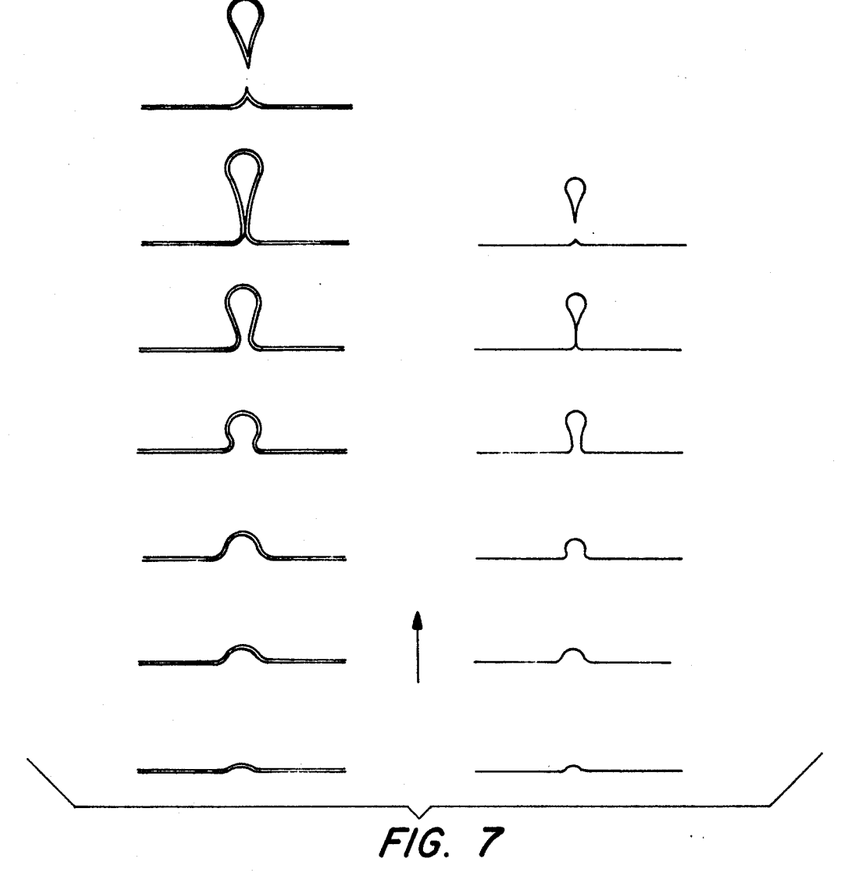
FIG. 7 is a diagram showing the state in which a gaseous flow passes through a liquid film.

The waste gas flowed into the scrubber first passes through perforated tray 4. In this case the gaseous flow is more or less uniformly distributed and also is brought in contact with the scrubbing solution, becoming a wet gas accompanied by minute liquid drops, which rises up and passes through the liquid film flow on lower mesh tray 2. At this point the first dust collection is accomplished and at the same time the gaseous flow is almost completely uniformly distributed for the horizontal crosssection of the gaseous flow path. This is because the pressure resistance to the passage of gas of the wetted mesh tray with a liquid film at a gas velocity of the order of 2.5 m/sec is as considerably large as about 25 mm water column per one stage of mesh tray as compared with the velocity head of the gaseous flow at the same velocity. Thus the gaseous flow passed through lower mesh tray 2, acquiring almost the same velocity throughout the whole horizontal crosssection of the gaseous flow path, rises up and passes through the spray region due to spray manifold 5 and nozzles 6, upper mesh tray 1, and demister 3, respectively, as a stable gaseous flow without maldistribution such as channelling, etc. This implies that the quantity of the sprayed solution accompanying the gaseous flow is quite even throughout the whole crosssection of the gaseous flow path, and demister 3 also can be used under an ideal condition. Even if the liquid film on upper mesh tray should have been broken by the ruggedness in one portion of the mesh tray to create the portion having no liquid film, the sprayed solution is supplied along with the gas to the whole horizontal crosssection of the gaseous flow path, or the whole surface of the mesh tray and in a continuous manner, so that that portion having no liquid film can immediately form a liquid film, and hence, unless the mesh tray itself is cut off by any mechanical method whatever it never happens that any portion having no liquid film develops on the mesh tray. it is therefore obvious that on upper mesh tray 1 there is always formed a stable liquid film. By the passage through the liquid film on this upper mesh tray 1 the main dust collection in this invention is completed, but the gas after the passage through this upper mesh tray 1 is in a supersaturated state being accompanied by a mist. Thus, if the dust captured in the scrubbing solution satisfactorily as above should be discharged into the atmosphere in the form of mist it will be quite nonsense, therefore for the purpose of removing the mist, the scrubber is provided with demister 3 at its gas exit, and the dust collection by scrubbing in the scrubber of this invention is brought to completion finally by the passage through demister 3.

The structure of the scrubber and the behaviors of the scrubbing solution as well as the waste gas being treated having thus been described as above, the dust collecting mechanism by scrubbing and the structures of the components thereof that are characteristic in this invention will be referred to in the following.

The scrubber of this invention does not differ at all from the conventional scrubbers in that the fundamental dust collecting mechanism involves capturing the dust in the gas being treated by scrubbing solution and dissolving it in said scrubbing solution. The point solely depends on how to capture the dust in the form of minute fumes by lesser quantity of scrubbing solution, and how to construct the capturing means.

In the scrubber as shown in FIG. 6, the elements that are directly concerned in the dust collection are the following four.

I. Perforated tray 4:

The gas passes through each of the holes of the perforated tray at a flow rate of 6 m/sec or more, whereby the gas contacts with the scrubbing solution flowing down, but the contact which can promise an effective dust collection occurs at the edge portion of each hole through which the gas passes, where the scrubbing solution is splashed by the gaseous flow to be finely divided so that full contact and violent impact are achieved between the gas and the scrubbing solution. However, if such contact by perforated tray is carried out only in one or two stages the dust collection effect is almost nil. Therefore the object of such contact by perforated tray is rather to obtain uniform distribution of the gaseous flow in the sense that the gas is sufficiently wetted so as to be accompanied by liquid drops and the gaseous flow is prevented from tending to an extreme maldistribution.

II. Lower mesh tray:

The scrubbing solution coming through the perforated tray 4 accompanying the gaseous flow and the scrubbing solution flowing down along the wall of the tower shell join to form a liquid film, through which the gas passes without breaking said liquid film, with the dust collection being thereby performed.

The liquid film on this tray is one of the major dust collecting elements of the present dust collector together with the liquid film on upper mesh tray 1.

In addition, since the mesh tray attended by a liquid film has a comparatively large resistance to the passage of gas it can function as a uniform distributor of the gaseous flow. Therefore, also in the point that this function of lower mesh tray 2 contributes to the establishment of the conditions under which an ideal liquid film can be formed on upper mesh tray 1, lower mesh tray is an important element.

III. Spray 5, 6:

As shown in FIG. 6 spraying device is comprised of spray manifold 5 and spray nozzles 6, which latter are horizontally disposed so as to equally divide the cross-section of the gaseous flow path. The number of spray nozzles is preferably from at least 4 or more to about 18 per 1 $m^2$ of the cross-section of the gaseous flow path in the sense of generating more finely divided liquid drops. The scrubbing solution sprayed by spray nozzles will come into sufficient contact and impact with the gas as in the conventional spraying tower, but the dust collection effect obtained in this way is little worth consideration as compared with that of the liquid film flow, therefore, the spray is rather used only as one of the means that can form an ideal liquid film on upper mesh tray 1.

IV. Upper mesh tray 1:

The misty scrubbing solution which is uniformly sprayed throughout the whole cross-section of the gaseous flow path forms a stable liquid film on upper mesh tray 1, accompanying the uniformly distributed gaseous flow. So far as the gaseous flow exists, the liquid film thus formed does not suffer breaking or interruption unless the spray is stopped or the scrubbing solution is extremely decreased. The dust collection achieved by the passage of the gas through this liquid film is the main point in the dust collection by scrubbing in the present scrubber.

Thus the waste gas scrubber of this invention is a scrubber of liquid film type which involves the combined use of spray in its structure as well as in its function. Both the so-called liquid film type and the so-called spray type are already prior known, but why in the conventional scrubbers was as much as 1 thru 2 l/$m^3$ waste gas of scrubbing solution required?

In order to enhance the dust collecting ability (or absorbability) in a scrubber it is necessary that (A) in a more finely divided state the gas and the scrubbing solution come into contact or collision, as frequently as possible.

(B) since the solubility (or absorbability) is governed by the concentration difference, the scrubbing solution should always be renewed.

It is therefore desirable that so long as the liquid film is not broken by the gaseous flow it should be as thin as possible, always continuously flowing in one direction without staying, flowing back, and the like.

The thinned liquid film not only saves the quantity of the scrubbing solution per a flow rate of scrubbed gas but also meets the above described requirement A. As well known, the state, in which a gas passes through a liquid film without breaking it, is like a model shown in FIG. 7, which indicates that the thinner the film through which the gas passes, the finer the bubble which is formed. In this invention, mesh trays 1 and 2 are mounted somewhat inclined so as to make the liquid film flow, and this is based on the above described requirement B.

Even if a liquid film flowing down in an inclined direction is merely formed by the aid of spray and gaseous flow on a mesh tray mounted with an inclination of about 10°, it does not immediately imply that an ideal liquid film has been formed. That is to say, in order to obtain an ideal liquid film which is thinner and sufficiently strong and endurable, it is necessary to investigate more fully the mesh itself. For this purpose, as a matter of course there is recommended a mesh tray having a fine mesh weaved with thin filaments. Also, taking into account that most of the gases being treated are strongly corrosive and the mesh tray must be installed within the scrubber, repaired, and so on, the following requirements have been investigated as the conditions of selection for the mesh tray material.

(i) it is resistant to a wide range of corrosion caused by acids, alkalis, salts, etc.

(ii) it is commercially available and can be fabricated at low cost as compared with stainless steel.

(iii) it is a material of light weight, and so on.

As a result of an experiment the mesh tray having the structure shown in FIGS. 8, 9, and 10 and the specifications described below has been established as the one most meeting the above described conditions.

Figure 8:
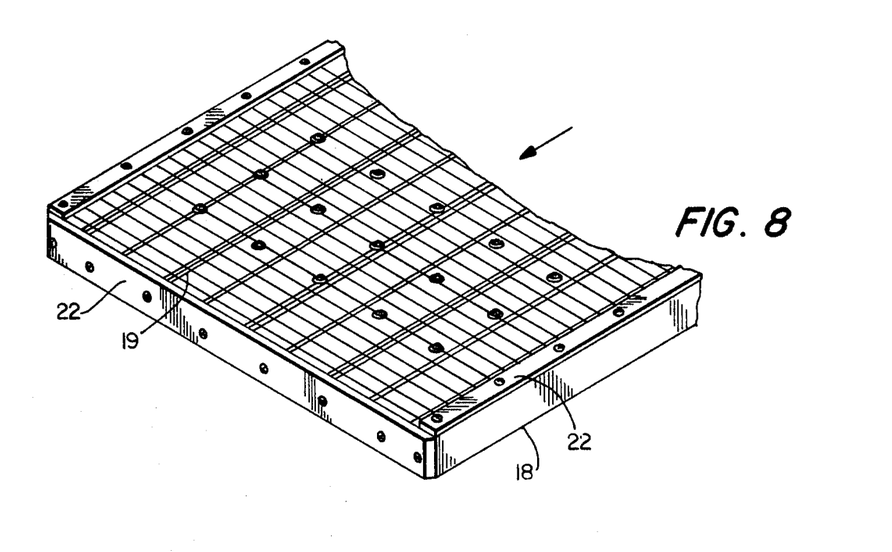
FIGS. 8 and 9 are diagrams showing the structure of mesh tray.
Figure 10:
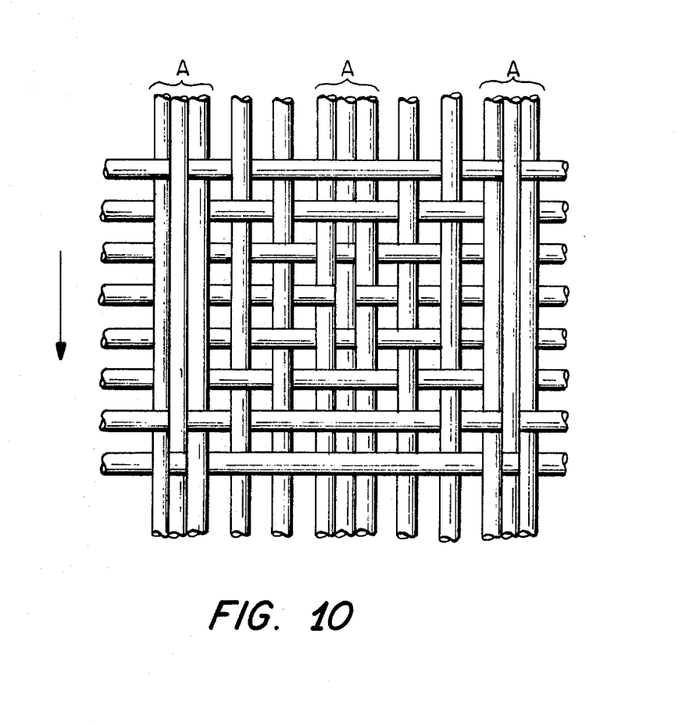
FIG. 10 is a diagram showing the structure of a mesh on a mesh tray.

The large arrow marks shown in FIGS. 8 and 10 indicate the downflow direction of the liquid film. FIG. 8 is a diagram illustrating the mesh tray assembly in the scrubber of this invention, corresponding to both upper mesh tray 1 and lower mesh tray 2 in FIG. 6. Those used as 1 and 2 are quite the same as mesh tray.

When the size of the openings exceeds 2 mm, the liquid film is liable to be broken by the gaseous flow, so that this makes it necessary to increase the flow rate(L/G) of the scrubbing solution(L) per unit flow rate of the gas(G) being scrubbed.

On the other hand, when the openings are too extremely small, such as, for example, on the order of 0.5 mm or less (above 35 mesh), the pressure loss of the gaseous flow passing through the liquid film becomes increased, and thus, in either case, the mesh tray cannot be a medium which can form the liquid film adapted for the purpose of achieving an excellent effect of dust collection, and so it cannot be practical.

Figure 9:
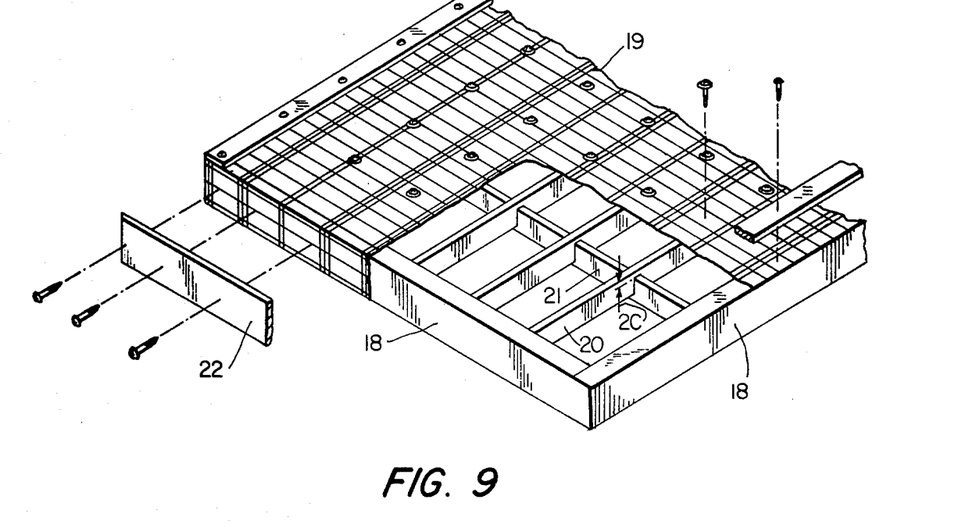

Member 18 in FIG. 8 and FIG. 9 is the main frame constituting mesh tray. 19 is a mesh, 20 is a longitudinal beam provided in the same direction as the downflow liquid film, and 21 is a cross beam provided in the direction perpendicular to 20. As the frames of mesh tray, namely, main frame 18, beams 20 and 21, and splint 22 it is preferable to use FRP (plastic reinforced with glass fiber) or antiseptic-treated wood equivalent to CCA-1 of JIS A 9107 or PF-2 of JIS A 9102.

Also, as mesh 19, use is made of cloth woven into a beehive structure with synthetic fiber of 300 thru 700 denier, such as, for example, Saran (trade name for the fiber produced by Dow Chemical Corp. in U.S.A.) of polyvinylidene chloride system, etc. FIG. 10 illustrates the method of weaving mesh 19 into a beehive structure in detail. The direction of the filaments designated by A and B in FIG. 10, that are respectively woven in the form of a set of three filaments, is the downflow direction of the liquid film.

As shown in FIGS. 8 and 9 mesh tray is assembled by fixing mesh 19 made of the above described synthetic fiber on the upper surfaces of main frame 18 and longitudinal beams 20 as if sliding door paper is pasted to a sliding door, with the circumference of mesh 19 being fastened to main frame 18 by means of splint 22 and screws, and the portion of mesh 19 inside the main frame being fastened to longitudinal beams 20 in the downflow direction of the liquid film at a pitch of about 150 mm by means of screws with a washer. Crossbeams 21 that are perpendicular to the downflow direction of the liquid film are provided at the position somewhat lower than the upper surface of longitudinal beams 20 (noted by "x" in FIG. 9) in the downflow direction of the liquid film so that they may not disturb the downflow of the liquid film. Consequently, the upper surfaces of main frame 18 and longitudinal beams in the downflow direction of the liquid film are fabricated so as to become horizontal on the same plane.

Saran mesh trays made of such a material and having a simple structure are satisfactory in cheapness, light weight, and corrosion resistance. In particular saran is stable even to solvents.

The above explanation has referred to one example of the scrubber of this invention which is now under construction for practical use, and especially, illustrating one scrubber for urea dust provided on the top of a urea prilling tower full explanation has been given to its structure and function. It will be readily understood that if the scrubbing solution in this invention is replaced by an absorbing liquid the present scrubber can be used in the absorption of noxious gases, and also, it can be used as well for the same purpose even against the apparatuses other than the urea prilling tower.

With reference to a few examples the effect of this invention will further be explained below.

EXAPLES 1 - 3

A waste gas scrubber having a structure as specified in this invention was provided on the top of a urea prilling tower which was then in actual operation, and it was operated under the following conditions.

| | Example 1 | Example 2 | Example 3 |
|---|---|---|---|
| Flow rate of waste gas ($m^3$/Hr) | 6,700 | 7,000 | 7,000 |
| Temperature of waste gas (° C) | 26 | 26.5 | 27 |
| Actual gas velocity (m/sec.) | 2.53 | 2.64 | 2.64 |
| Pressure loss of waste gas (mm water column) | 79 | 84 | 85 |
| Quantity of scrubbing solution of circulated ($m^3$/Hr) | 1.5 | 1.5 | 1.5 |
| Temperature of scrubbing solution (° C) | 26 | 26.5 | 27 |
| Quantity of scrubbing water / Quantity of gas being treated (l/$m^3$) | 0.224 | 0.214 | 0.214 |

By the above described scrubbing the following results were produced in the respective Examples.

| | Example 1 | Example 2 | Example 3 |
|---|---|---|---|
| Dust content of waste gas fed (prilling tower effluent) (mg/N$m^3$) | 71.2 | 89.4 | 92.6 |

-continued

|  | Example 1 | Example 2 | Example 3 |
|---|---|---|---|
| Particle diameter (weight average) ($\mu$) | 7.0 | 7.0 | 6.9 |
| Count of fume particles of waste gas (in % relative to that of dust particles) | 87.5 | 86.1 | 85.9 |
| Dust content after treatment (scrubber effluent) (mg/Nm$^3$) | 18.0 | 15.4 | 17.0 |
| Dust collection efficiency (%) | 74.7 | 82.8 | 81.6 |

What is claimed is:

1. A process for treating waste gas from a urea prilling tower employing a scrubbing solution, said waste gas containing hydrophilic and water-soluble fumes, which process is characterized by that in a scrubbing tower, which is provided with a perforated tray, a slightly inclined lower mesh tray, a spraying device of scrubbing solution, a slightly inclined upper mesh tray, and a demister, the waste gas is caused to flow successively through the perforated tray, the lower mesh tray, the upper mesh tray and the demister; scrubbing solution is sprayed co-currently with the flow of said waste gas from a position between the upper mesh tray and lower mesh tray onto the underside of said upper mesh tray from a plurality of nozzles uniformly distributed throughout the cross-sectional area of the scrubber to cause the scrubbing solution to fully wet the entire surface of said upper mesh tray and to form a continuous liquid film on said upper mesh tray; and causing said liquid film to flow from said upper mesh tray to said lower mesh tray and thereby form a coninuous film on said lower mesh tray and to thereafter flow to the perforated tray, and thus, the waste gas, which is introduced into said scrubbing tower from the bottom while said scrubbing solution is discharged from said tower wetting said perforated tray, is contacted with said scrubbing solution on each of the above described trays so as to remove the fumes in said waste gas, and further mist, which is the liquid entrainment with said waste gas when it passes through the upper mesh tray, is recovered by means of said demister.

2. A process as defined in claim 1 wherein said waste gas is passed at a superficial velocity of 1 thru 3 m/sec.

3. A process as defined in claim 1 wherein said waste gas is passed at a superficial velocity of 2.5 m/sec.

4. A process as defined in claim 1 wherein the scrubbing solution is sprayed in a particle size of 300 $\mu$ or less.

5. A scrubbing tower for treating waste gas with a film of a scrubbing solution and comprising a gas inlet at a bottom portion thereof; a gas outlet at a top portion thereof; and between said inlet and said outlet and in succession from the bottom of the tower: a perforated tray; a first inclined mesh tray; a spraying means for spraying said scrubbing solution; a second inclined mesh tray; and a demisting means; said first and second inclined mesh trays having mesh openings of less than 2 mm in size and being inclined such that a continuous film of scrubbing solution can be formed thereon; said spraying means comprising a plurality of nozzles disposed such that the distance to the underside of said second inclined mesh tray is about twice the reach of the spray from the spraying means to said second inclined mesh tray so that the spray can fully wet the whole surface of said second inclined mesh tray.

6. An scrubbing tower as defined in claim 1 wherein said second mesh tray is made up of two mesh trays in parallel, spaced about 100 mm apart.

7. An scrubbing tower as defined in claim 1 wherein said mesh trays are made up of a screen with openings less than 2 mm in size (above ASTM Standard Sieve No. 10), and a frame and beams supporting said screen.

8. A scrubbing tower as defined in claim 5 wherein said spraying means is capable of forming a spray of liquid droplets having a particle size of 300 $\mu$ or less.

9. A scrubbing tower as defined in claim 5 wherein said first and second inclined mesh trays are inclined at an angle of about 10° to a plane perpendicular to the axis of said tower.

10. A scrubbing tower as defined in claim 5 wherein the scrubbing means comprises from 4 to 18 nozzles per m$^2$ of the cross-sectional area of the tower.

* * * * *